United States Patent [19]

Howe

[11] Patent Number: 5,152,249

[45] Date of Patent: Oct. 6, 1992

[54] ATTACHMENT DEVICE FOR ANIMAL EAR TAG

[76] Inventor: Steve R. Howe, 7728 W. Michigan Ave., Glendale, Ariz. 85308

[21] Appl. No.: 851,803

[22] Filed: Mar. 16, 1992

[51] Int. Cl.$^5$ .............................................. A01K 29/00
[52] U.S. Cl. ..................................... 119/156; 40/301
[58] Field of Search ................... 119/156; 40/300, 301, 40/302

[56] References Cited

U.S. PATENT DOCUMENTS 630,349  8/1899  Harvey ................................... 40/301
1,347,868  7/1920  Nichols ................................. 40/302

FOREIGN PATENT DOCUMENTS 71777  2/1916  Switzerland ......................... 40/301

Primary Examiner—Gene Mancene
Assistant Examiner—Thomas Price
Attorney, Agent, or Firm—Joseph H. Roediger

[57] ABSTRACT

An attachment device for animal ear tags wherein the stud driven through the ear is provided with a molded skirt having a region of increased flexibility. Location of the region of flexibility away from the base reduces the likelihood of damage to the animal ear if the tag becomes snagged on foliage or fencing.

15 Claims, 1 Drawing Sheet

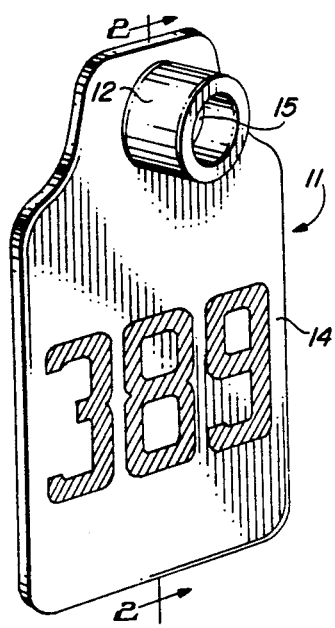
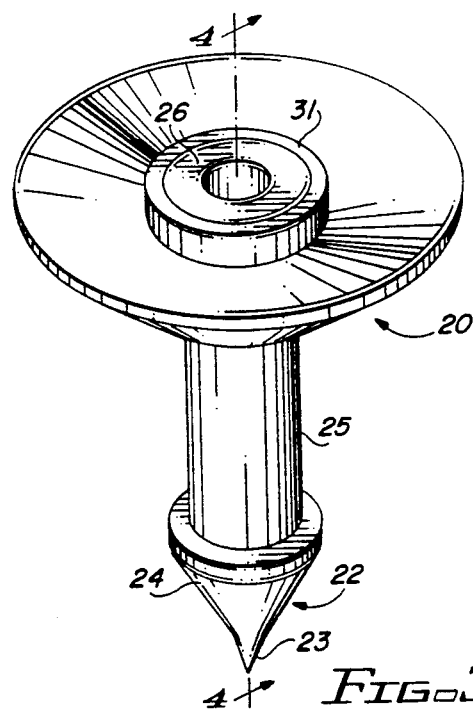
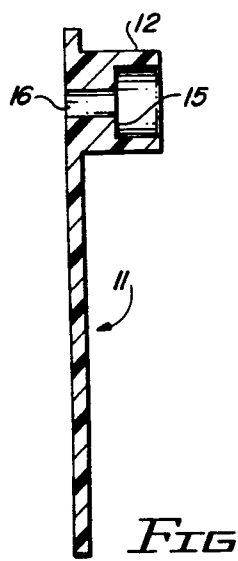
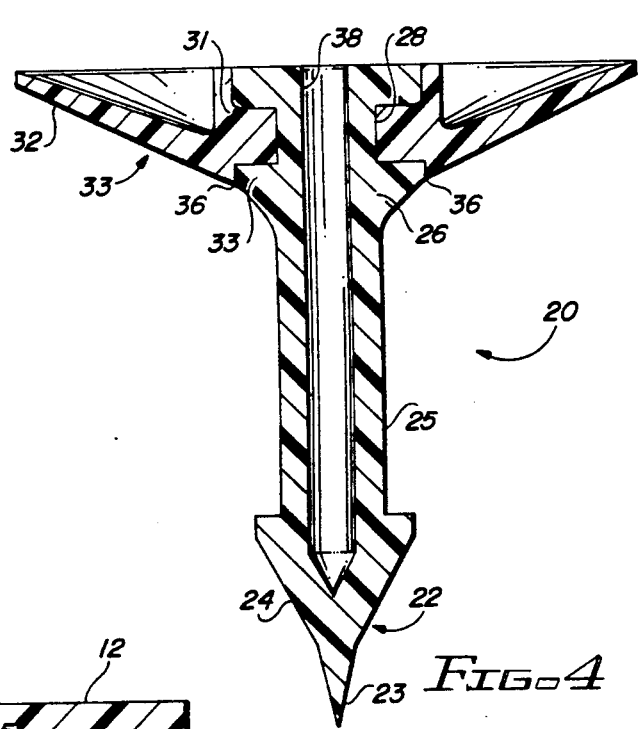
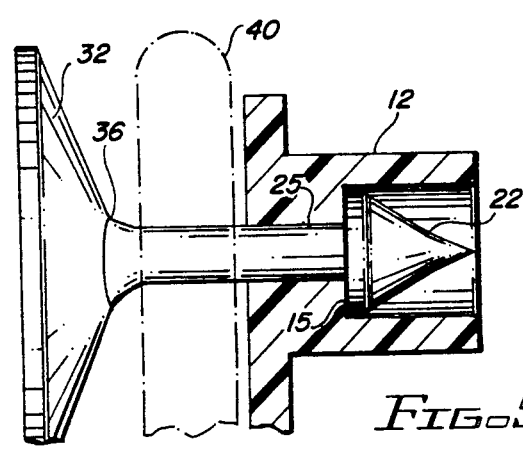

ATTACHMENT DEVICE FOR ANIMAL EAR TAG

BACKGROUND OF THE INVENTION

Identification tags have been used for numerous types of animals throughout the years. The original metal clips pressed on the ear of the animal have been replaced with more sophisticated combinations of pins which pierce a portion of the body of the animal, and a tag having a receiving socket through which a portion of the pin enters. The tag, typically formed of a soft plastic, is provided with an indicia receiving surface made integral with a smaller region containing the socket. Typically, the socket is located on the outside of the tag near one end with a hole extending through the tag into the socket. A shoulder is contained within the receiving socket in order to retain a piercing head contained on the pin or shaft urged normally through the animal ear.

A mechanical applicator, similar in respect to a pair of pliers, is typically utilized to urge the piercing head through the body portion of the animal and into the receiving socket in the large area tag. Since the stem or shaft of the attachment device is required to transmit the force from the applicator tool to the body piercing head, the attachment device is rigid. In practice, the attachment device includes the piercing head affixed to a stem or shaft and a base member of larger diameter which directly receives the force from the applicator. The attachment device is formed of a rigid material such as nylon so that the wound created in the ear is not made larger than necessary due to movement of the piercing head during application or misalignment with the receiving socket. When the identification tag is affixed to the animal by the attachment device, an untended wound exists in the adjacent tissue of the animal. In order to promote recovery by the animal from this intentionally inflicted wound, it is desirable to use devices that provide smooth contact surfaces adjacent the exposed tissue.

In the design of an ear tag and associated attachment device, it has been found beneficial to provide a relatively large diameter skirt at the base of the ear piercing attachment device. The skirt is formed of a flexible plastic material and is molded to the base member so as to provide a smooth exterior surface between the stem or shaft and the skirt surrounding the base. This construction reduces the likelihood that the wound will be irritated by ridges or sharp contours in the attachment device. It further provides the opportunity for air flow to occur between the base of the shaft or stem and the adjacent part of the animal and promote healing. In order to secure the flexible skirt to the base of the rigid ear piercing member, a number of transverse holes have been provided in the base so that the molded material flows therethrough to form a unitary structure. While this construction was intended for the purpose of reducing the detachment of the skirt from the stem base during normal use, the flexible material in the small diameter hole stended to fracture thereby weakening the joining of skirt to base. In addition, the design of a mold providing these transverse channels is complex and expensive. Since the base portion is the larger diameter portion of the attachment device, the channels being filled with material are long relative to their diameter. The molding material must flow through and fill the channels in the base portion of the stem which requires high mold pressures and plastic materials having good flow characteristics. These factors add to the cost of manufacture.

As the animal wearing its identification tag moves about its environs, the tag is likely to be engaged by foliage, fences, or other animals. The flexible skirt attached at the base of the stem provides a measure of protection against tearing or ripping from the ear due to the forces encountered. The forces applied to the tag are countered in part by the flexibility of the skirt. Since the skirt is attached in a manner which surrounds the outer surface of the base, flexure of the skirt occurs where it joins the rigid base. Consequently, the edge contour of the rigid base results in a sharp corner being urged against the adjacent flesh of the animal. Frequently, the wound becomes reopened and the danger of infection reappears. This is to be avoided since the wound is untended and the reopening may be unnoticed for long periods.

Accordingly, it is an object of the present invention to provide an attachment device for an animal identification tag containing a rigid stem and base which provides improved and controlled flexibility between the ear piercing member and the retaining skirt affixed thereto. In addition, the present invention is directed to the provision of an attachment device having a skirt formed of flexible material wherein the region of flexure is spaced outwardly from the rigid base thereof. A further object is to provide a structural configuration for an attachment device which eliminates transverse channels to simplify the manufacturing process thereof and provides a durable locking of skirt to the base and stem combination.

SUMMARY OF THE INVENTION

This invention relates to an attachment device for the affixation of an animal identification tag to a body portion of an animal wherein a receiving socket is located on the identification tag. The socket is located adjacent the body portion of the animal and receives the piercing end of the attachment device and secures same in a movably engaged position. The identification tag is of conventional design and includes a planar indicia-displaying member of relatively large area.

The attachment device includes an engaging means for piercing a portion of the animal, typically the ear, and remaining extended therethrough during normal use. The engaging means contains an elongated stem having first and second opposing ends with the first end used for piercing and being dimensioned to enter the receiving socket and the tag. A base member is affixed to the opposing end of the stem and receives the force applied by the applicator tool. The base member has a perimetric surface thereabout which contains an annular groove.

A limit means in the form of a flexible skirt is formed about the perimetric surface of the base member and extends outwardly therefrom. The limit means maintains the engaging means portion of the attachment device in the hole formed in the ear of the animal. The limit means includes a surround which contacts the outer surface of the base member and fills the annular groove. A flange is formed integral with the surround and extends outwardly therefrom. The flange includes a region of increased flexibility. This region of increased flexibility is intentionally located outwardly spaced from the base member by the surround. As a result, the application of a non-axial force to the tag and attachment device causes the assemblage to move within the animal and urge the flexible skirt against the ear. Since the most likely point of flexure is spaced from the base member, the flexible skirt material is present on both sides of the pressure region. As a result, the wound in the animal is contacted by the flexible skirt rather than the edge contour of the rigid base member thereby reducing the likelihood of a reopening of the wound.

The surround is formed of the same material and made integral with the flexible flange. The surround is in contact with the outer surface of the base member and is maintained in this position by the portion thereof that extends into the annular groove. Consequently, the surround is supported adjacent the rigid base is less likely to be deformed as a result of an applied force than the flange. This construction has been found to move the region of increased flexibility away from the base member. In addition, the flexible flange can be made non-uniform in cross-sectional thickness to assist in moving the region of increased flexibility further out and away from the base.

Further features and advantages of the invention will becomes more readily apparent from the following detailed description of a preferred embodiment thereof when taken in conjunction with the accompanying drawings.

BRIEF DESCRIPTION OF THE DRAWINGS

FIG. 1 is a view in perspective of a typical animal identification tag suitable for use with the subject invention.

FIG. 2 is a cross-sectional view of the tag of FIG. 1 taken along line 2—2.

FIG. 3 is a view in perspective of a preferred embodiment of the attachment device which is the subject of the present invention.

FIG. 4 is a cross-sectional view of the embodiment of FIG. 3 taken along line 4—4.

FIG. 5 is a view in partial cross-section showing the embodiment inserted in a receiving socket of the tag of FIG. 1.

DESCRIPTION OF THE PREFERRED EMBODIMENT

Referring now the FIGS. 1 and 2, an animal identification tag 11 is shown including a large area planar surface for receiving a series of numerals imprinted thereon. In addition, the tag includes a receiving socket 12 formed at the upper end thereof. The receiving socket 12 is generally cylindrical in shape and contains a shoulder 15. A receiving passage 16 extends from the shoulder to the rear surface of the tag and is dimensioned to receive a portion of the attachment device driven therethrough by an applicator. The tag is formed of a molded plastic so that it exhibits a degree of flexibility to accommodate the attachment device. In addition, the tag may be formed to include an electronically responsive device therein or impregnated with pesticides that have a time-release pattern so that not only is the tag used for animal identification, but also a carrier for an insecticidal composition.

The attachment device for the affixation of the tag 11 of FIG. 1 is shown in FIGS. 3 and 4. The device 20 includes an elongated stem with opposing ends. One end is provided with a body piercing member 22 formed with a tapered point 23. Point 23 is the entry portion that inflicts a wound in the ear of the animal as it is urged through the flesh and on into passage 16 of an ear tag positioned on the other side of the animal's ear. While the conical tip 23 initially pierces the ear, a broader angle conical section 24 follows the tip into the wound and spreads it to receive stem 25. A base member 26 is provided at the other end of stem 25 and is larger in diameter. At the moment of application of the attachment device to the animal tag, the force necessary to make the attachment is directly applied to the exposed surface of base member 26. Since the applied force is transmitted through the base member and shaft to the piercing end, the engaging means is made of unitary construction using a relatively rigid material such as nylon. The inability of the engaging means to retain its shape during the application of the force necessary of affect attachment has potentially harmful effects upon the subject animal since it can unduly increase the size of the resultant wound.

The construction of the engaging means which pierces the body portion of the animal and remains in place during the useful life of the animal identification tag is seen in FIG. 4 wherein the base member 26 is provided with an annular groove 28. The groove extends around the base member and is formed in the outer perimetric surface thereof. As shown, the annular groove is located closer to the stem than to the exposed surface of the base member. The location of the groove is selected to provide a significant portion of material between the groove and the surface receiving the applied force. By locating the groove axially closer to the stem, the tendency for the base member to be deformed by the application of a slightly off center applied force is reduced.

Limit means is shown formed about the base member and extends outwardly therefrom to maintain the engaging means in the body portion of the animal during use. The limit means include a surround 31 and a flexible flange or skirt formed integral therewith and extending outwardly therefrom. The surround 31 contacts the perimetric surface of the base member and fills the circumferential groove 28. As shown, the base member 26 contains a channel edge 33 in the region where it is joined to the stem 25. The outer surface of the channel edge 33 is contoured to provide a smoother transition between the larger diameter base member and the stem. During use, this transition region contacts the animal in the area adjacent the wound which was inflicted upon insertion of the engaging means.

The limit means is formed in place on the attachment device by use of conventional molding techniques. Since there are no narrow passages to be filled by the molding material, the mold is not complex and a wide range of plastic materials can be utilized to form the limit means.

The surround 31 extends axially along the outer surface of the base member 26 to the transition region. The surface contour of the surround in the region where it contacts the outer surface of the skirt is made in conformance with the contour of the transition region and the skirt and provides a smooth exterior surface. The flexible skirt 32 extends outwardly from the surround 31 and is shown in FIG. 4 as having an increasingly reduced thickness dimension in the radial direction. In the general region where the skirt is joined to the adjacent portion of the surround 31, the amount of flexible material with which the limit means is made is increased by more than a factor of two. As a result, a region of increased stability is provided for the limit means by the surround. A region of increased flexibility is established adjacent the surround 31. By providing this abrupt change in the amount of material behind or underlying the outer surface of the limit means, the application of an external force to the skirt will result in a flexure occurring in this region and not to occur at the juncture 36 between the surround 31 and the transition region 33 of the stem. The juncture 36 does not open and become part of the external surface of the attachment device and the likelihood of a separation of the limit means from the base member 26 is essentially eliminated. Thus, the adjacent portion of the animal's ear does not encounter the sharp edges of the rigid base member which tends to reopen the original wound. The construction of the present device has moved the region of flexure away from the junction between the elongated system and base with the limit means.

The device inserted through a portion of animal ear 40 and retained in the receiving socket 12 of an animal identification tag is shown in the partial cross-section of FIG. 5. The piercing member has been driven through the ear portion 40 by an applicator applying force directly to the base of the engaging means while at the same time positioning the receiving socket on the opposing side of the ear. The application of the force drives the piercing member 22 through the passage 16 beyond the retaining shoulder 15. The fit between parts when assembled is loose to permit relative movement thereof and also to permit airflow to the wound formed in the animal ear. One type of applicator successfully used with the subject invention is the Apollo Tag Applicator which has the general appearance of a pair of pliers with wide flat jaws, and containing retaining clips for the identification tag and the attachment device. The ear portion of the animal is placed between the jaws when the applicator is loaded and hand pressure on the handles to close the jaws completes the installation. The identification tag is frequently large and likely to be snagged by foliage or fencing during normal use. This momentary snagging produces a torque resulting in a force applied to the skirt by the adjacent portion of the ear. This occurrence has frequently reopened the wound due to the pressure of a sharp corner of the rigid stem and base member against the sensitive tissue of the ear. However, by intentionally moving the region of flexure away from the engaging means and the juncture with the limiting means, the flexible skirt bends while the surround continues to remain in place adjacent the base member and transition region to protect the animal from the ridges of hard material.

In the embodiment of FIGS. 3 and 4, a cylindrical aperture is shown formed from the base through the stem into the piercing member 22. This cylindrical region can be used to receive a reinforcing pin which remains in the attachment device after installation and serves as a continuing resistor to flexure of the engaging device. In this type of embodiment, the stem and base member are unlikely to undergo any flexure during the applied torque thereby increasing the importance of the present invention beyond that of solid embodiments. Since a wide variety of applicators utilize a central pin with the applicator jaw to drive the engaging means through the wound, the cylindrical aperture 38 can also be used to receive the driving pin of different types of applicators. It should be noted that the particular form of applicator used and the absence of any cylindrical receiving aperture in the engaging means does not significantly affect the subject invention.

While the above description has referred to a specific embodiment of the invention, it is recognized that modifications and variations may be made therein without departing from the scope of the invention as claimed.

I claim:

1. An attachment device for the affixation of an animal identification tag to a body portion of an animal of the type wherein a receiving socket is located adjacent said body portion to receive the attachment device, said deivice comprising:
   a) engaging means for piercing a body portion of the animal and entering said receiving socket, said engaging means including
      i. an elongated stem; having first and second ends with said first end dimensioned to enter said receiving socket; and
      ii. a base member affixed to said second end for receiving an applied force, said base member having a perimetric surface containing an annular groove therein; and
   b) limit means formed about said base member and extending outwardly therefrom for maintaining said engaging means in the body portion of the animal, said limiting means including
      i. a surround which contacts the perimetric surface of said base member adjacent the annular groove and extending into said groove, said surround having a curved portion extending outwardly from said base member, and
      ii. a flange extending outwardly from said surround and including a region of increased flexibility.

2. The invention is accordance with claim 1 wherein said region of increased flexibility of said flange is spaced outwardly from said surround.

3. The invention in accordance with claim 2 wherein said engaging means includes a body-piercing member affixed to said elongated stem.

4. The invention in accordance with claim 3 wherein said base member has a larger diameter than said stem.

5. The invention in accordance with claim 4 wherein said engaging means further comprises a transition region affixed to said stem adjacent said base member, said transition region providing a uniform outer surface between said stem and said base member.

6. The invention in accordance with claim 5 wherein the annular groove is said base member has a rectangular cross section.

7. The invention in accordance with claim 6 wherein the perimetric surface of said base member is parallel to the elongated stem.

8. The invention in accordance with claim 7 wherein said flange extending outwardly from said surround is tapered to provide a uniform surface with said transition region.

9. An attachment device for an animal ear tag wherein a receiving socket on the ear tag is positioned adjacent the ear to receive a portion of the attachment device extending therethrough, said device comprising
   a) a stem having first and second ends;
   b) piercing means affixed to the first end of said stem for passing through the ear of the animal into the receiving socket of said ear tag;
   c) a base member affixed to the second end of said stem said base member containing an annular groove therein and an adjacent edge; and
   d) a flexible skirt having a curved contact surface and an opposing surface, said skirt being attached to said base member and covering the adjacent edge of said base member, said skirt extending into said annular groove; and e) a channel formed in the opposing surface of said skirt, said channel being space from said base member to establish a region of enhanced flexibility.

10. The invention in accordance with claim 9 wherein said skirt is outwardly tapered to provide a uniform contact surface with said stem and base members.

11. The invention is accordance with claim 10 wherein said channel extends circumferentially around said base member.

12. The invention in accordance with claim 11 wherein said skirt is formed with a non-uniform thickness which reduces in a radial direction.

13. The invention in accordance with claim 11 wherein said channel is formed with a non-uniform height which reduces outwardly from said base member.

14. The invention in accordance with claim 13 wherein said piercing means includes a piercing end to enter the ear and a flared end enlarging the opening in the ear to provide a concave surface between said ends.

15. The invention in accordance with claim 14 further comprising a reinforcing pin contained in said base member.

* * * * *